COMPUTING DEVICE

Original Filed April 29, 1949

3 Sheets-Sheet 1

INVENTOR
Arthur W. Vance
BY Morris Rabkin
ATTORNEY

INVENTOR
Arthur W. Vance
BY Morris Kahn
ATTORNEY

Jan. 23, 1962 A. W. VANCE 3,018,046

COMPUTING DEVICE

Original Filed April 29, 1949 3 Sheets-Sheet 3

INVENTOR
Arthur W. Vance
BY Morris L. Rabkin
ATTORNEY

United States Patent Office 3,018,046

Patented Jan. 23, 1962

3,018,046

COMPUTING DEVICE

Arthur W. Vance, Cranbury, N.J., assignor to Radio Corporation of America, a corporation of Delaware Continuation of abandoned application Ser. No. 90,360, Apr. 29, 1949. This application Dec. 29, 1955, Ser. No. 556,195
14 Claims. (Cl. 235—164)

Figure 1:
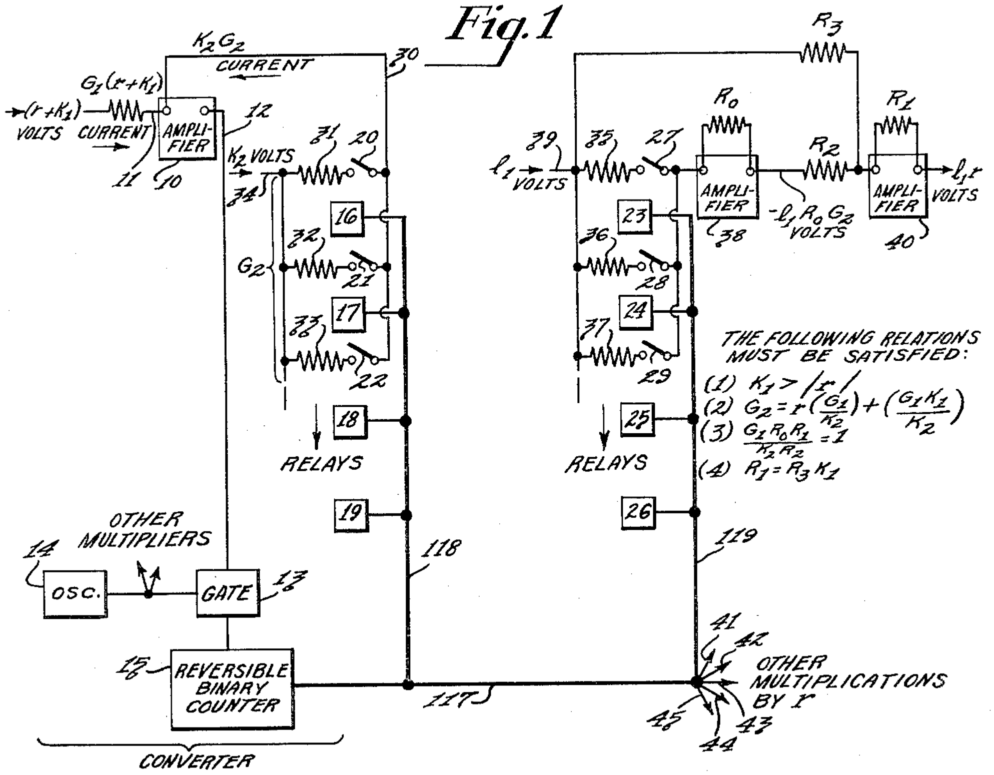

This invention relates to computing devices, and more particularly to an improved multiplying device which is capable of operating with extreme accuracy.

This application is a continuation of copending application Serial No. 90,360 filed April 29, 1949, now abandoned.

This improved multiplying device consists of two parts. The first part (hereinafter called a converter) functions through relay switches and fixed resistors to establish a conductance $G_2$ proportional to the multiplier $r$. The first and second parts of the device are so interconnected that the conductance $G_2$ is established in both its parts. The second part (hereinafter called a multiplier) has established in it a voltage proportional to the multiplicand $l_1$ which voltage is applied to the conductance $G_2$ to obtain a current proportional to the product $l_1G_2$ and, therefore, to the product $l_1r$.

The converter includes a D.C. amplifier which is made to have unity gain and is automatically and continuously stabilized so that its input and output voltages have their zero values simultaneously. To the input of this amplifier is applied a voltage proportional to the value of the multiplier $r$ plus a constant. Its output circuit is connected to a gate circuit through a high gain amplifier. The gate circuit is so polarized that pulses from an oscillation generator are added in a reversible counter when the output of a high gain amplifier is positive and are subtracted in that counter when the output of the high gain amplifier is negative.

Each stage of the counter is connected to a different relay which functions to connect a different resistor from a standard voltage source to the input grid circuit of the D.C. amplifier. When a current equal and opposite to that due to the input voltage is fed back to the input of the amplifier, the gate closes thereby interrupting the transmission of pulses to the counter.

If the input voltage of the amplifier is increased or decreased, the gate opens and the count of the counter likewise increases or decreases and, thereby operates to adjust the conductance of the feedback circuit accordingly.

The multiplier part of the device includes a similar bank of relays and resistors by means of which is established a conductance proportional to the multiplier $r$ plus a constant $K_1$. To this conductance is applied a voltage proportional to the multiplicand $l_1$. The resulting current is fed into a D.C. amplifier which drives another D.C. amplifier through a resistor. A resistor connected from the multiplicand voltage source $l_1$ to the input of the second amplifier serves to balance out the error current due to the part of the conductance resulting from the constant $K_1$. The output of the second amplifier is then proportional to the product $l_1$ times $r$.

The summing amplifiers of both parts of the device are automatically and continuously stabilized for zero, drift and gain so that the zero and drift stabilizing factor does not limit the frequency response. Stabilization for gain is accomplished as usual by the use of overall feedback. Stabilization for zero and drift is by means of a contractor type modulator which chops the error voltage so that it may be amplified in an A.C. amplifier. The output of this amplifier is rectified and applied to a point of the D.C. amplifier where the zero setting voltage is conventionally applied by manual adjustment.

The reversible binary counter is like that disclosed by a Flory and Morton application Ser. No. 464,293, filed Nov. 2, 1942, Patent No. 2,462,275. This counter is so designed that it will "count up" or add when one set of its interstage coupling tubes is energized and will "count down" or subtract when the other set of its interstage coupling tubes is energized. The set of coupling tubes to be energized is selected by the output voltage of the D.C. amplifier of the converter in such a way that the count is additive when the amplifier is understabilized and is subtractive when the amplifier is overstabilized. As a result the conductance established by the resistors connected in the feedback circuit always assumes a value proportional to the voltage $r$ plus $K_1$, which voltage is proportional to the value of the multiplier and is applied to the input of the D.C. amplifier of the converter.

The invention has for its principal purpose the provision of an improved multiplying device and method of operation whereby the product of two factors may be derived with extreme accuracy, the ultimate accuracy being limited only by the number of binary stages and the obtainable accuracy of fixed resistors. Other purposes are the provision of a multiplying device which is of relatively simple construction, and the provision of a device which is readily adapted to multiply a number of factors by the same multiplier.

The invention will be better understood from the following description considered in connection with the accompanying drawing and its scope is indicated by the appended claims.

Figure 2:
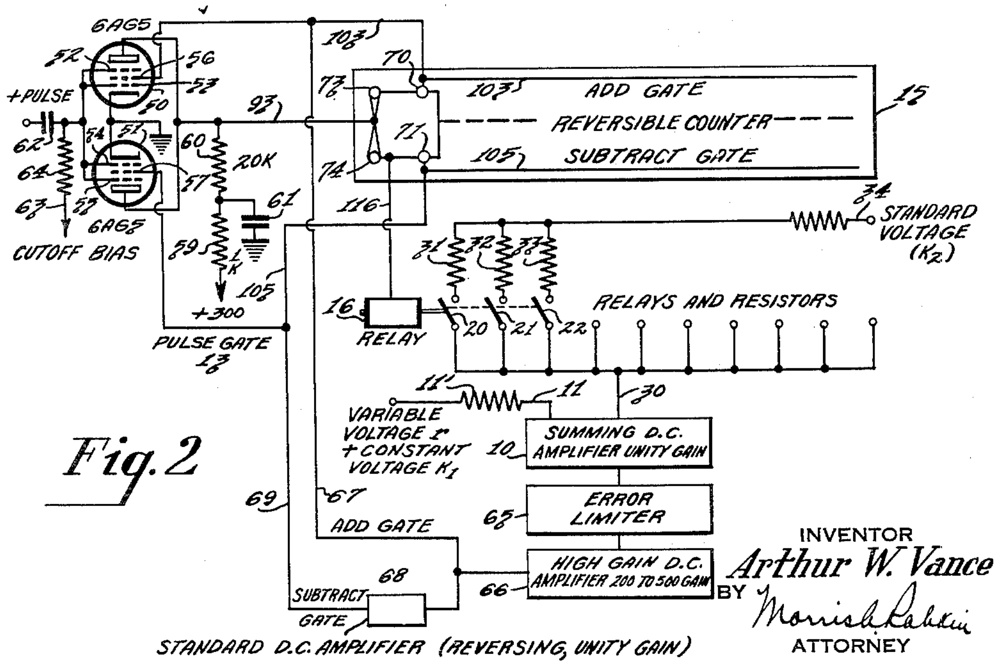
Figure 3:
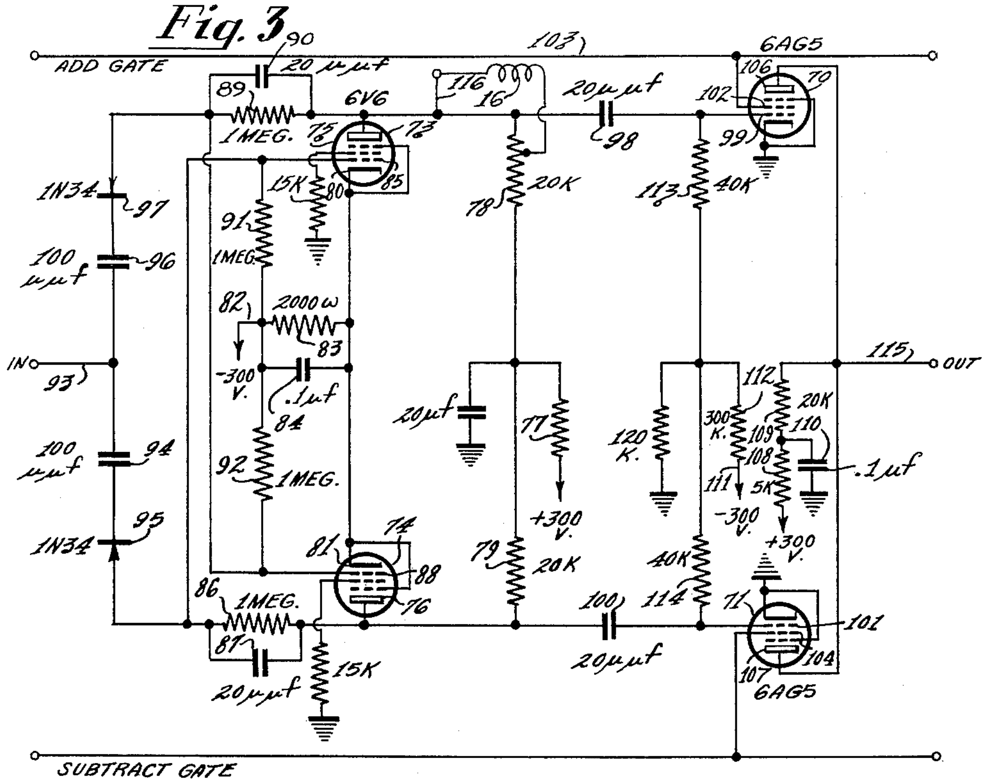
Figure 4:
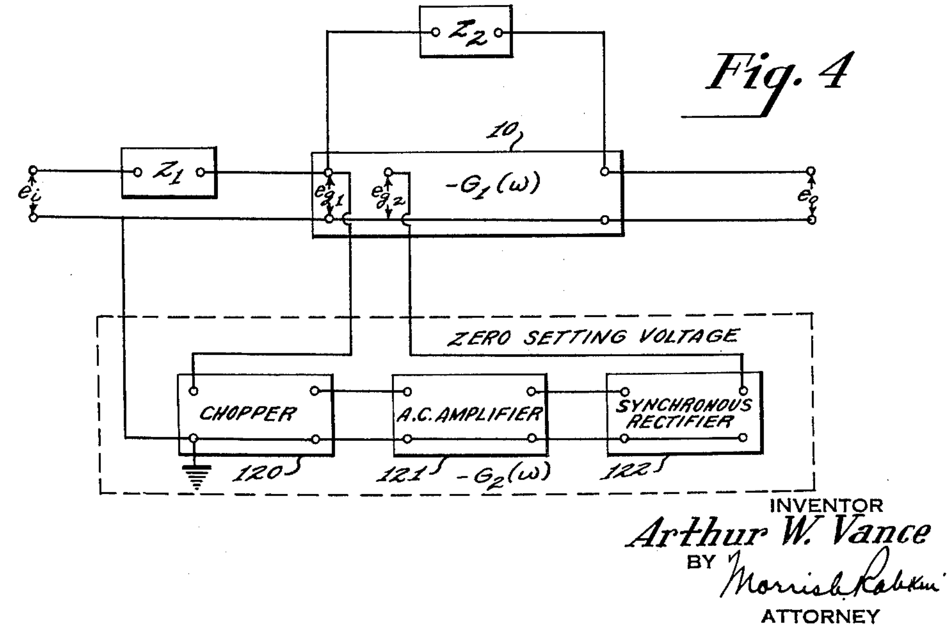
Figure 5:
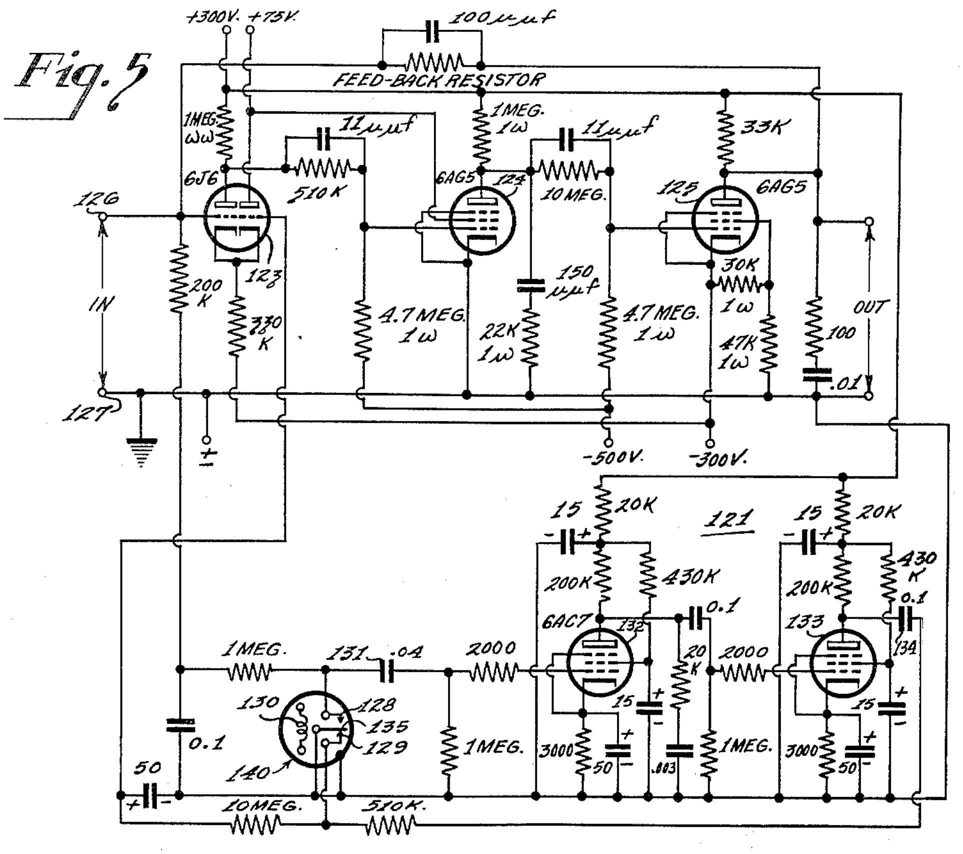
Figure 6:
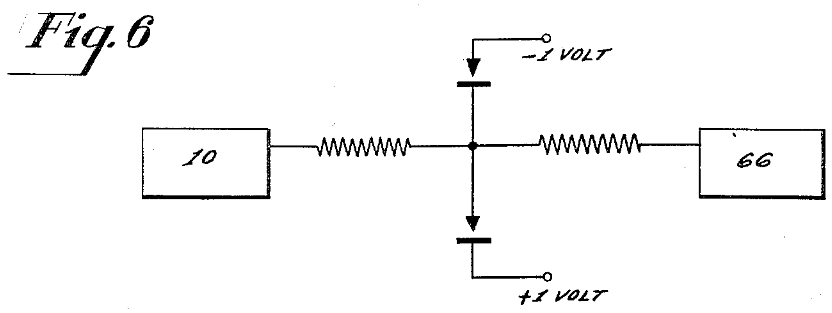

Referring to the drawings:

FIG. 1 is a block diagram illustrating the relation between the various parts of the improved multiplying device, FIG. 2 illustrates the connections of the gate and feedback loop of the converter, FIG. 3 shows the connections of one stage of the reversible binary counter which forms a part of the converter, FIG. 4 is a block diagram showing the relation between the various parts of the summing amplifiers of the device, FIG. 5 is a wiring diagram showing the connections of the amplifier of FIG. 4, and FIG. 6 shows the connections of a limiter which is not an essential part of the invention but may be connected between the amplifiers as indicated in FIG. 2.

FIG. 1 shows the improved multiplying devices as including an amplifier 10 having an input lead 11 and an output lead 12. The lead 12 is connected to a gate 13. As will be explained, the gate 13 is so designed that it responds to the output voltage of the amplifier 10 to cause pulses from an oscillation generator 14 to be added in a reversible counter 15 when the output of the amplifier 10 is positive and to be subtracted in the counter 15 when the output of the amplifier 10 is negative.

To each stage of the counter 15 is connected a different relay 16, 17, 18 or 19 which is energized to close its contacts 20, 21, 22 or other contacts not shown, when the counter stage to which it is connected is in a binary one condition. Also connected to the different counter stages in the same manner are relays 23 to 26 by which contacts 27 to 29, and other contacts not shown, are similarly operated. The detailed connections of these various relays are not shown. Their character depends on the frequency at which they are required to operate.

Each of the relay-operated contacts 20 to 22 is arranged to connect into the feedback loop 30 of the amplifier 10 a different resistor 31, 32 or 33. As each relay is energized it functions to connect a resistor from the constant voltage $K_2$ to the input grid of amplifier 10. The conductance of each resistor is proportional to the power of 2 equal to the order of the corresponding counter stage. Therefore the total conductance of all the connected resistors is proportional to the total count of the counter.

The resistors 35, 36, 37, etc. are like the resistors 31, 32, 33, etc. and are similarly controlled by their respective relays. To this resistance network is applied, a voltage $l_1$ which is representative of the value of multiplicand $l_1$, and from it is derived the input current to a summing amplifier 38.

Through a resistor $R_3$, a current proportional to $l_1$ is supplied to an amplifier 40 for the purpose of balancing out the current due to that part of the conductance of the relay resistor network caused by the constant voltage $K_1$.

Output from the amplifier 38 is applied to the input of the amplifier 40 which has a resistor $R_1$ connected in its feedback loop and delivers at its output a voltage representative of the product of the two factors of the multiplication.

As indicated by the leads 41 to 45, a number of other circuits similar to that just described may be connected in parallel to the converter section of the device for multiplying as many other factors by the factor $r$ which determines the input to the amplifier 10.

Since negative conductance cannot be used, a large positive constant $K_1$ has been added to the factor $r$ in order that the sign of $G_2$ be always positive. Partial products containing this constant are removed from the output of the device through proper adjustment of scale factors and other constants in a manner now to be explained.

In order to admit positive and negative values of $r$, the fixed voltage $K_1$ is made greater than the maximum absolute magnitude of $r$. Designating by $G_1$ the input conductance of the feed-back amplifier 10 and by $K_2$ the fixed voltage applied to the resistor network associated with the relays 16 to 19, etc., the counter 15 is in equilibrium when $$(r+K_1)G_1=K_2G_2$$

or:

$$G_2=r\frac{G_1}{K_2}+\frac{G_1K_1}{K_2}$$

On the other hand, the voltage at the output of the first summing amplifier 38 of the multiplier is evidently:

$$V_2=-l_1R_0G_2=-l_1\frac{R_0(r+K_1)G_1}{K_2}$$

which gives at the output of the second summing amplifier:

$$V_3=-\left(-l_1\frac{R_0(r+K_1)G_1}{K_2}\right)\left(\frac{R_1}{R_2}\right)-l_1\frac{R_1}{R_3}$$

or:

$$V_3=l_1r\left(\frac{R_0G_1R_1}{K_2R_2}\right)+l_1\left(\frac{R_0K_1G_1R_1}{K_2R_2}\right)-l_1\left(\frac{R_1}{R_3}\right)$$

If now we choose:

$$\frac{R_0G_1R_1}{K_2R_2}=1$$

$$\frac{R_0K_1G_1R_1}{K_2R_2}=\frac{R_1}{R_3}$$

we shall obviously have:

$$V_3=l_1r$$

as required. (The second equation of condition given above can be written:

$$R_1=R_3K_1$$

by substituting:

$$\frac{R_0K_1G_1R_1}{K_2R_2}=K_1$$

from the first equation of condition.)

The number of relay positions required for each network $G_2$ is a function of both the base of numeration, B (in this case 2) and of the number of distinct values of the factor (including positive and negative values and zero) which are necessary. Designating the number of relay positions by N and the number of distinct factor values by A, we have:

$$N=B\log_B(A)$$

from which the following table is derived:

| A=Number of distinct values of $r$ | N=Number of relay positions | Number of relays |
|---|---|---|
| 512 | 18 | 9 |
| 1,024 | 20 | 10 |
| 2,048 | 22 | 11 |
| 4,096 | 24 | 12 |
| 8,192 | 26 | 13 |
| 16,384 | 28 | 14 |

The number of relays required is evidently $$\frac{N}{B}$$

in this case, $$\frac{N}{2}$$

The above indicated formula is simply established. The number of distinct values sought determines the number of counter stages required to count through all the values. When a binary counter is used, the number of stages required is the logarithm to the base two of the number of values sought. Since each stage has one relay with two contact positions, the number of contact positions are two times the logarithm to the base two of the number of values sought.

The gate 13 is shown in FIG. 2 as including two tubes 50 and 51 of the 6AG5 type. Each of these tubes include a pair of interconnected grids 52—53 or 54—55 and an additional grid 56 or 57. Operating potential is applied to their anodes from a +300 volt lead through a common resistor 59—60 which is connected at a point between its ends to a high frequency filter capacitor 61.

Pulses from the source 14 (see FIG. 1) are applied to the grids 52—53 and 54—55 through a coupling capacitor 62. Also applied to these grids through a lead 63 and a resistor 64 is a bias potential of such value that the applied pulses reach the output of the tubes only when the potential of the grid 56 or 57 is made sufficiently positive.

Potential is applied to the grid 56 from the output of the amplifier 10 through a limiter 65, an amplifier 66 and a lead 67.

The connections of the limiter 65 are indicated in FIG. 6. It includes a pair of resistors which are connected between the amplifiers 10 and 66, said resistors having plus and minus voltages applied to their common terminal through separate rectifiers. The amplifiers 10 and 66 are alike except that the amplifier 66 has a higher feedback resistor to give it higher gain.

Potential is applied to the grid 57 from the output of the amplifier 10 through the limiter 65, the amplifier 66, a unity gain reversing amplifier 68 and a lead 69. From these connections it follows that (1) the potential of the grid 56 has its most positive values when the output of amplifier 10 is positive due to an increase in the voltage $r$ (across a resistor 11') and (2) the potential of the grid 57 has its most positive values when the output of amplifier 10 is negative due to a decrease in the voltage *r*. As a result, either the tube 50 or the tube 51 transmits pulses to the input stage of the counter 15 when the gain of amplifier 10 is other than a very low value.

Whether the applied pulses are added or subtracted in the counter 15 is determined by which tube is conducting. This is so for the reason that the counter 15 has its additive coupling tubes 70 connected to the same source of potential as the grid 56 and its subtractive coupling tubes 71 connected to the same source of potential as the grid 57. As a result, the pulses are added in the counter 15 when the tube 50 is conducting and are subtracted when the tube 51 is conducting. When the output of the amplifier 10 is negligible, of course, neither tube conducts and no pulses are applied to the input of the counter.

Only the first stage of the counter is indicated in FIG. 2. As has been explained above, the number of counter stages is a function of both the base of numeration and of the number of distinct values of the factor *r* which are involved.

FIG. 3 shows the complete connections of one of the counter stages. This stage includes a pair of tubes 73 and 74 which have operating potential applied to their anodes 75 and 76 through a common resistor 77 and separate resistors 78 and 79. The cathodes 80 and 81 of the two tubes are connected to a negative terminal 82 through a resistor 83 which is shunted by a capacitor 84. The control grid 85 of tube 73 is cross-connected to the anode 76 of the tube 74 through a resistor 86 which is shunted by a capacitor 87. The control grid 88 of the tube 74 is similarly cross-connected to the anode 75 of tube 73 through a resistor 89 which is shunted by a capacitor 90. A resistor 91 is connected between the grid 85 and the terminal 82, and a resistor 92 is connected between the grid 88 and the terminal 82. With these connections, current conduction is stable in either one or the other of the tubes 73 and 74 and is shifted from one of the tubes to the other in response to the application of a negative pulse to a lead 93 which is connected (1) to the grid 85 through a capacitor 94 and a crystal rectifier 95 and (2) to the grid 88 through a capacitor 96 and a crystal rectifier 97. The pulses thus applied to the grids 85 and 88 are derived from the low voltage terminal of the resistor 60 (see FIG. 2) which is connected in the anode circuits of the gate tubes 50 and 51.

The anode 75 of the tube 73 is coupled through a capacitor 98 to the grid 99 of the interstage coupling tube 70 and the anode 76 of the tube 74 is coupled through a capacitor 100 to the grid 101 of the coupling tube 71. The tube 70 also has a grid 102 which is connected to the additive control lead 103. This is also true of all the similar coupling tubes of the successive stages of the counter 15. Similarly the tube 71 has a grid 104 which is connected to the subtractive lead 105. This is also true of all the similar coupling tubes of the successive stages of the counter.

Operating potential is applied to the anodes 106 and 107 of the interstage coupling tubes 70 and 71 through resistors 108 and 109 which have their common terminal coupled to ground through a filter capacitor 110. Bias potential is applied to the grid 99 from a lead 111 through resistors 112 and 113 and to the grid 101 from the lead 111 through resistor 112 and a resistor 114. The output lead 115 of the coupling tubes is connected to the input lead (not shown) of the next successive stage of the counter.

As explained in greater detail by the above-identified patent, (1) the counter stage 73—74 is in a binary zero condition when the tube 74 is conducting and in a binary one condition when the tube 73 is conducting, (2) the counter is provided with a reset switch (not shown) by which current conduction may be initially established in the tube 74 of each of its successive stages, (3) the coupling tube 70 is biased on and the coupling tube 71 is biased off so that the pulses applied to the terminal 93 are added in the counter, and (4) the coupling tube 71 is biased on and the coupling tube 70 is biased off so that the pulses applied to the terminal 93 are subtracted from the count previously established in the counter.

The stage 73—74 is provided with a lead 116 which is connected to the relay 16 as indicated in FIG. 2. Similar leads connect the successive stages of the counter with the relays 17, 18, 19, etc. some of which are shown in FIG. 1 wherein the heavy lines 117, 118 and 119 are used to indicate a multiplicity of leads.

The various amplifiers of the improved multiplying device are of the D.C. type. They are automatically and continuously stabilized for zero, drift and gain. Stabilization for gain is accomplished by the use of overall feedback. Stabilization for zero and drift is by means of a contactor type of modulator which chops the error voltage so that it may be used in an A.C. amplifier which has its output rectified and applied to the D.C. amplifier at the point where the zero setting is normally applied.

FIG. 4 is a block diagram showing the relation between the various parts of a summing type amplifier such as the amplifiers 10 and 38 of FIG. 1. The amplifier described herein is described in a patent of Goldberg, et al. for Direct Current Amplifiers, U.S. 2,684,999, filed April 28, 1949. It is also described in an article by Edwin A. Goldberg in the RCA Review, June 1950, entitled "Stabilization of Wide-Band Direct-Current Amplifiers for Zero and Gain." Any summing type amplifier which has high gain and is stable may be used. One such is shown and described in the article in the May 1947 issue of the "Proceedings of the I.R.E." by Ragazzini et al., entitled "Analysis of Problems in Dynamics by Electronic Circuits." However, the summing amplifier described herein is preferred because of its stability and ease of adjustment. In this figure, the amplifier 10, for example, is shown as having its input connected to its zero and shift correction point through a chopper 120, an A.C. amplifier 121 and a synchronous rectifier 122. At various points on the figure appear letters which have the following significance:

Let $e_i$=Input voltage
$e_o$=Output voltage
$e_{g1}$=Error voltage, or actual input voltage to main amplifier
$e_{g2}$=Zero setting voltage
$Z_1$=Input series impedance
$Z_2$=Feedback impedance
$G_1(w)$=Gain characteristic of the main amplifier for $(e_{g1}-e_{g2})$
$G_2(w)$=Gain characteristic of the stabilizing unit
$F(w)=G_1(w)+G_1(w)G_2(w)$ Then, since $e_{g1}$ is applied in opposition to $e_{g2}$, the output voltage $e_o$ is the product of the negative of the input and the gain of the amplifier 10.

$$e_o=-G_1(w)(e_{g1}-e_{g2}) \tag{1}$$

Similarly for the stabilizing unit, $$e_{g2}=-G_2(w)e_{g1} \tag{2}$$

$$e_o=-e_{g1}(G_1(w)+G_1(w)G_2(w)) \tag{3}$$

Substituting in (3) the defined value of F($w$), $$e_o=-e_{g1}F(w) \tag{4}$$

Now, using Kirchoff's law and summing all the currents at the input to the amplifier 10 (shown in FIGURE 4 as the point to which $e_{g1}$ is applied)

$$\frac{e_i-e_{g1}}{Z_1}=\frac{e_{g1}-e_o}{Z_2}$$

substituting for $e_{g1}$ the value found in (4) and solving for $e_o$ we obtain $$e_o = -e_i \frac{Z_2F(w)}{Z_1F(w)+Z_1+Z_2} \quad (5)$$

The factor $G_2(w)$ contains the threshold information, the value of the threshold being a function of the contact potential and any stray pickup of the chopper 120. Both of these factors can be held extremely small by exercising suitable care in design and construction.

For low frequencies, $G_2(w)$ is made quite large by incorporating a large gain in the A.C. amplifier 121. This means that the threshold for these frequencies is controlled by the threshold of the chopper. The maximum rate at which the stabilizing network can adjust the threshold is a function of the frequency of the chopper. A 60 cycle chopper has been used. Since the normal rate of drift of zero is quite small, adequate stabilization is obtained in spite of the necessarily low cut-off frequency of $G_2(w)$.

$G_2(w)$ being negligible at the high frequencies, the gain factor becomes $G_1(w)$, and the analysis of amplifier operation is the same as though the amplifier were a normal one without zero and drift stabilization. The zero setting voltage may be inserted in the amplifier anywhere past the point where $e_{g1}$ appears. A dual triode with a common cathode resistor has been used for the input stage. The error voltage, $e_{g1}$, is applied to one grid and the stabilizing voltage is applied to the other grid.

In FIG. 5, the D.C. amplifier of FIG. 4 is shown as including three stages 123, 124 and 125. It can be seen that the input terminals 126 and 127 are connected to the fixed contact 128 and movable contact 135, respectively of the vibrator or chopper 140 which has an energizing coil 130 connected to an A.C. source (not shown). The contact 128 is coupled through a capacitor 131 to the input of the A.C. amplifier 121 which includes the stages 132 and 133. The output of the last stage 133 is coupled through a capacitor 134 to the fixed contact 129, which, together the movable contact 135 of the chopper 140, performs the function of synchronously rectifying the error voltage and applying it to the input of the D.C. amplifier.

Either the D.-C. amplifier 10 or the gate 13 may be biased so that a predetermined minimum voltage is required to open the gate 13. In this manner the system will not oscillate about two positions. Alternatively if interpolation is desired it may be desirable to allow the system to oscillate about two relay positions and average the result obtainable thereby for a more accurate result.

What the invention provides is an improved computing device which operates at high speed and with extreme accuracy to derive from a voltage $r$ representing a multiplier and a voltage $l$ representing a multiplicand a resultant voltage which is representative of the product $r$ times $l$. In addition to the advantages of high speed and extreme accuracy, this improved device has other important advantages in that it involves relatively few parts and is automatically and continuously maintained independent of variations which would otherwise decrease the accuracy of its response to the voltages entering into the computation.

What is claimed is:

1. In a device for multiplying a multiplicand $l$ by a multiplier $r$, the combination of a current summing amplifier, means for supplying to the input of said amplifier a current proportional to the value of $r$, means including a gate responsive to the output of said amplifier for transmitting pulses only when the output of said amplifier exceeds a predetermined minimum, a counter responsive to said last-mentioned means for adding the transmitted pulses when said amplifier output is one polarity and subtracting said transmitted pulses when said amplifier output is the opposite polarity, means for supplying a fixed voltage, a plurality of variable networks, a first one of said networks being connected from said fixed voltage means to said summing amplifier input, means coupling said first and a second of said networks to said counter to be varied responsive to the condition of said counter for establishing in said networks conductances proportional to the value of $r$, and means for applying to said second one of said networks a voltage proportional to the value of $l$.

2. In a device for multiplying a multiplicand $l$ by a multiplier $r$, the combination of a current summing amplifier, means for supplying to the input of said amplifier a current proportional to the value of $r$, means including a gate responsive to the output of said amplifier for transmitting pulses only when the output of said amplifier exceeds a predetermined minimum, a counter responsive to said last-mentioned means for adding the transmitted pulses when said amplifier output is one polarity and subtracting said transmitted pulses when said amplifier output is the opposite polarity, means for supplying a fixed voltage, a plurality of variable networks, a first one of said networks being connected between said fixed voltage and the input of said summing amplifier, means coupling said first and a second of said networks to said counter to be varied responsive to the condition of said counter for establishing network conductances proportional to the value of $r$, means for applying to the second of said networks a voltage proportional to the value of $l$, and amplifying means responsive to the output of said second network for producing a voltage representative of the product of $r$ and $l$.

3. In a device for multiplying a multiplicand $l$ by a multiplier $r$, the combination of a current summing amplifier, means for supplying to the input of said amplifier a current proportional to the value of $r$, means including a gate responsive to the output of said amplifier for transmitting pulses only when the output of said amplifier exceeds a predetermined minimum, a counter responsive to said last-mentioned means for adding the transmitted pulses when said amplifier output is positive and subtracting said transmitted pulses when said amplifier output is negative, a source of fixed voltage, a pair of variable conductance networks, the first of said networks being connected between said source and the input of said summing amplifier, means coupling said first and a second of said networks to said counter to vary said networks responsive to the condition of said counter for establishing conductances proportional to the value of $r$, means for applying to the second of said networks a voltage representative of the value of $l$, and means including an amplifier responsive to the output of said second network for producing a voltage representative of the product of $r$ and $l$.

4. A combination as set forth in claim 1 wherein said counter is of the binary type, and each of said variable networks includes a plurality of resistors having values by which the conductance of each network may be adjusted by amounts proportional to different powers of two, and said means coupling both of said networks to said counter includes a plurality of relay means each responsive to one condition of a different associated stage of said counter for connecting an associated one of said resistors into the associated one of said networks.

5. The combination of a current summing amplifier, means for supplying to the input of said amplifier a current proportional to the value of a variable, a counter, means including a gate connected to respond to the output of said amplifier for transmitting pulses to said counter, means coupling said counter to said amplifier and responsive to said output for actuating said counter for adding the transmitted pulses when said amplifier output is one polarity and subtracting said transmitted pulses when said amplifier output is the other polarity, a plurality of adjustable impedance means, means to apply a fixed voltage to one of said impedance means, means coupling said one of said impedance means to the input of said summing amplifier, and means coupled to said counter to adjust each of said impedance means responsive to the count of said counter for establishing conductances proportional to the value of said variable.

6. In a device for multiplying a multiplicand $l$ by a multiplier $r$, the combination of a current summing amplifier, means for supplying to the input of said amplifier a current proportional to the value of $r$ plus a constant, a counter means including a gate connected to respond to the output of said amplifier for transmitting pulses to said counter, means coupling said counter to said amplifier to respond to said output for adding the transmitted pulses when said amplifier output is one polarity and subtracting said transmitted pulses when said amplifier output is the opposite polarity, a plurality of adjustable impedance means, means to apply a fixed voltage to one of said impedance means, means coupling said one impedance means to the input of said summing amplifier, means coupled to said counter to adjust each of said impedance means responsive to the count of said counter for establishing conductances proportional to the value or $r$ plus a constant, means for applying to the second impedance means a potential proportional to the value of $l$, and amplifying means responsive to the output voltage of said second impedance means for producing a voltage representative of the value of the product of $r$ and $l$.

7. In a device for multiplying a multiplicand $l$ by a multiplier $r$, the combination of a current summing amplifier, means for supplying to the input of said amplifier a current proportional to the value of $r$ increased by a constant of predetermined value, a reversible counter, means including a gate connected to respond to the output of said amplifier for transmitting pulses to said counter, means coupling said counter to said gate for adding said transmitted pulses when said amplifier output is one polarity and subtracting said transmitted pulses when said amplifier output is the opposite polarity, a plurality of variable conductance networks, means for supplying a fixed voltage, a first of said networks being connected between said fixed voltage means and the input of said amplifier, means coupling said networks to said counter to be responsive to the condition of said counter for establishing conductances proportional to the value of $r$ increased by said constant value, means for applying to the second of said networks a voltage proportional to the value of $l$, a first amplifying means connected to respond to the output of said second network for producing a voltage representative of the value of the product of $r$ increased by said constant value and $l$, and a second amplifying means connected to respond to the outputs of said first amplifying means and said second network for producing a voltage representative of the value of the product of $r$ and $l$.

8. A device as set forth in claim 6 wherein each stage of said counter is of the binary type, each of said variable conductance networks includes a plurality of resistors having values by which the conductance $G_2$ of each network may be adjusted by amounts proportional to different powers of two, and said means coupling both of said networks to said counter includes a plurality of relays each responsive to one condition of a different stage of said counter for connecting a different one of said resistors into the associated one of said networks.

9. A device as set forth in claim 6 wherein said means including a gate connected to respond to the output of said amplifier for transmitting pulses includes means to limit the amplitude of the output of said amplifier, a high gain amplifier connected to receive the output of said amplitude limiting means, a first and a second electron discharge tube each having an anode, cathode and two control grids, means to apply pulses to one control grid in each of said tubes, a first connection between the output of said high gain amplifier and the other control grid in said first tube, and a reversing amplifier connected between the output of said high gain amplifier and the other control grid in said second tube.

10. A computer device comprising converter means, and multiplier means connected to said converter means, said converter means including counting means, and further means including a feedback circuit for establishing a count in said counting means proportional to a first variable quantity, means for applying a second variable quantity to said multiplier means, said multiplier means including means connected to said counting means for producing a varying signal proportional to the product of said count and said second variable quantity.

11. A computer device comprising converter means, and multiplier means connected to said converter means, said converter means including reversible counting means, means for supplying pulses, and means including a feedback circuit for controlling the transmission of said pulses to said counting means to establish a count in said counting means proportional to a first variable quantity, means for applying a second variable quantity to said multiplier means, said multiplier means including means connected to said counting means for producing a varying signal proportional to the product of said count and said second variable quantity.

12. A computer device comprising converter means, and multiplier means connected to said converter means, said converter means including digital counting means having a plurality of digital stages and means including a feedback circuit for establishing a count in said counting means proportional to a first variable quantity, said multiplier means including a plurality of circuit elements each corresponding to a different one of said digital stages, means for supplying a varying signal proportional to a second variable quantity, means responsive to signals from said digital stages for coupling corresponding ones of said circuit elements to said signal supplying means to provide a varying signal proportional to the product of said variable quantities.

13. A device for multiplying two quantities comprising a counter, means for establishing a count in said counter proportional to one of said quantities, variable conductance means, means connected to said counter for varying said conductance means to a value proportional to said count, means for applying to said conductance means an electrical signal proportional to the other of said quantities, and output means connected to said conductance means for deriving an electrical signal proportional to the product of said quantities.

14. A computer device for multiplying a plurality of variable quantities comprising converter means, and multiplier means connected to said converter means, said converter means including digital signal registering means having a plurality of digital stages, means for supplying a first one of said variable quantities, and means for establishing in said registering means a digital representation of said first variable quantity, said multiplier means including a plurality of circuit elements having different set values representative of the values of said digital stages, means for supplying a varying signal proportional to a second one of said variable quantities, means responsive to signals registered in said digital stages for coupling said signal supplying means to certain ones of said circuit elements to establish a resultant circuit value proportional to said first quantity and to provide a varying signal proportional to the product of said variable quantities.

References Cited in the file of this patent

UNITED STATES PATENTS

| | | |
|---|---|---|
| 2,624,508 | Dickinson | Jan. 6, 1953 |
| 2,715,678 | Barney | Aug. 16, 1955 |